(12) United States Patent
Maas et al.

(10) Patent No.: US 10,705,232 B2
(45) Date of Patent: Jul. 7, 2020

(54) INTEGRATED SEISMIC MONITORING SYSTEM AND METHOD

(71) Applicant: SHELL OIL COMPANY, Houston, TX (US)

(72) Inventors: Steven James Maas, Pflugerville, TX (US); James Brett Bunn, Austin, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/360,799

(22) Filed: Mar. 21, 2019

(65) Prior Publication Data

US 2019/0285763 A1  Sep. 19, 2019

Related U.S. Application Data

(60) Continuation of application No. 15/597,408, filed on May 17, 2017, now abandoned, which is a division of
(Continued)

(51) Int. Cl.
*G01V 1/18* (2006.01)
*G01V 1/20* (2006.01)
(Continued)

(52) U.S. Cl.
CPC .................. *G01V 1/18* (2013.01); *G01V 1/20* (2013.01); *G01V 1/226* (2013.01); *G02B 6/4415* (2013.01)

(58) Field of Classification Search
CPC . G01V 1/20; G01V 1/18; G01V 1/226; G02B 6/4415
(Continued)

(56) References Cited

U.S. PATENT DOCUMENTS 2,610,240 A  9/1952  Newell
2,958,048 A  10/1960 Woods
(Continued)

FOREIGN PATENT DOCUMENTS

CN  1251172 A  4/2000
CN  1325493 A  12/2001
(Continued)

OTHER PUBLICATIONS

International Search Report and Written Opinion received for PCT Patent Application No. PCT/US2013/028997, dated May 13, 2013, 7 pages.
(Continued)

*Primary Examiner* — Daniel L Murphy

(57) ABSTRACT

An integrated seismic system and method for monitoring seismic parameters of a subsurface structure is provided. The integrated seismic system includes a base station; a plurality of mobile satellite nodes, each of the plurality of mobile satellite nodes having sensor stations for collecting seismic data from the subsurface structure; and a fiber optic cable extending from the base station to the plurality of mobile satellite nodes and operatively linking the plurality of mobile satellite nodes and the sensor stations; the base station comprising: a light source for sending a light through the fiber optic cable, the light being distributed to the sensor stations and, in the sensor stations, experiencing a change or phase shift related to a physical property being measured; and a seismic acquisition unit for receiving seismic signals from the plurality of mobile satellite nodes via the fiber optic cable and generating seismic parameters therefrom.

4 Claims, 4 Drawing Sheets

Related U.S. Application Data application No. 14/383,207, filed as application No. PCT/US2013/028997 on Mar. 15, 2013, now abandoned.

(60) Provisional application No. 61/608,345, filed on Mar. 8, 2012.

(51) Int. Cl.
G01V 1/22 (2006.01)
G02B 6/44 (2006.01)

(58) Field of Classification Search
USPC .......................................................... 367/37
See application file for complete search history.

(56) References Cited

U.S. PATENT DOCUMENTS

| | | | |
|---|---|---|---|
| 3,202,926 A | 8/1965 | Ford et al. | |
| 3,283,293 A | 11/1966 | Pavey, Jr. et al. | |
| 3,398,395 A | 8/1968 | Ward | |
| 3,404,261 A | 10/1968 | Jespers et al. | |
| 3,445,809 A | 5/1969 | McLoad | |
| 3,495,076 A | 2/1970 | Jespers et al. | |
| 3,612,845 A | 10/1971 | Lawlor | |
| 3,699,325 A | 10/1972 | Montgomery, Jr. et al. | |
| 3,838,413 A | 9/1974 | Wehrmann | |
| 3,860,799 A | 1/1975 | Donko | |
| 3,863,201 A | 1/1975 | Briggs et al. | |
| 3,930,145 A | 12/1975 | Fort et al. | |
| 3,968,471 A | 7/1976 | Savit | |
| 3,986,008 A | 10/1976 | Fort et al. | |
| 3,986,162 A | 10/1976 | Cholez et al. | |
| 4,001,768 A | 1/1977 | Fort et al. | |
| 4,021,649 A | 5/1977 | Fort et al. | |
| 4,091,946 A | 5/1978 | Kraeft et al. | |
| 4,103,501 A | 8/1978 | Laurent | |
| 4,136,326 A | 1/1979 | Naudot et al. | |
| 4,326,275 A | 4/1982 | Butler | |
| 4,372,420 A | 2/1983 | White | |
| 4,384,808 A | 5/1983 | Yamamura et al. | |
| 4,458,341 A | 7/1984 | Goebel | |
| 4,525,818 A | 6/1985 | Cielo et al. | |
| 4,525,819 A | 6/1985 | Hefer | |
| 4,648,083 A | 3/1987 | Giallorenzi | |
| 5,138,678 A | 8/1992 | Briggs et al. | |
| 5,284,323 A | 2/1994 | Pawkett | |
| 5,314,047 A | 5/1994 | Nielsen | |
| 5,624,207 A | 4/1997 | Berges | |
| 6,002,640 A | 12/1999 | Harmon | |
| 6,260,656 B1 | 7/2001 | Orban et al. | |
| 6,314,056 B1 | 11/2001 | Bunn et al. | |
| 6,549,488 B2 | 4/2003 | Maas et al. | |
| 6,588,980 B2 | 7/2003 | Worman et al. | |
| 6,606,186 B2 | 8/2003 | Maas | |
| 6,631,095 B1 | 10/2003 | Bryant et al. | |
| 6,775,204 B2 | 8/2004 | Scott | |
| 6,827,597 B1 | 12/2004 | Metzbower et al. | |
| 6,850,461 B2 | 2/2005 | Maas et al. | |
| 6,988,854 B2 | 1/2006 | Porter | |
| 7,142,481 B1 | 11/2006 | Metzbower et al. | |
| 7,154,082 B2 | 12/2006 | Maas | |
| 7,222,534 B2 | 5/2007 | Maas et al. | |
| 7,349,591 B2 | 3/2008 | Maas | |
| 7,612,886 B2 | 11/2009 | Guerineau et al. | |
| 7,613,071 B2 | 11/2009 | Iseli et al. | |
| 7,622,706 B2 | 11/2009 | Maas | |
| 7,660,203 B2 | 2/2010 | Barakat et al. | |
| 7,688,673 B2 | 3/2010 | Ronnekleiv et al. | |
| 8,035,393 B2 | 10/2011 | Tenghamn et al. | |
| 8,075,223 B2 | 12/2011 | Ansay et al. | |
| 2003/0011843 A1 | 1/2003 | Maas | |
| 2003/0011878 A1 | 1/2003 | Maas | |
| 2003/0057769 A1 | 3/2003 | Scott | |
| 2004/0037165 A1 | 2/2004 | Lemenager et al. | |
| 2004/0257913 A1 | 12/2004 | Ray et al. | |
| 2005/0033519 A1 | 2/2005 | Fenton | |
| 2005/0047275 A1 | 3/2005 | Chamberlain et al. | |
| 2005/0098377 A1 | 5/2005 | Bary et al. | |
| 2005/0116079 A1 | 6/2005 | Stevens | |
| 2005/0174887 A1 | 8/2005 | Nash et al. | |
| 2006/0038115 A1* | 2/2006 | Maas ..................... G01H 9/004 250/227.18 |
| 2008/0018475 A1 | 1/2008 | Breed et al. | |
| 2008/0062815 A1 | 3/2008 | Iseli | |
| 2008/0080310 A1 | 4/2008 | Eperjesi et al. | |
| 2008/0080311 A1 | 4/2008 | Eperjesi et al. | |
| 2008/0123467 A1 | 5/2008 | Ronnekleiv et al. | |
| 2008/0192570 A1 | 8/2008 | Lennart et al. | |
| 2008/0272888 A1 | 11/2008 | Cardwell et al. | |
| 2009/0185170 A1 | 7/2009 | Maas | |
| 2009/0225629 A1 | 9/2009 | Ray | |
| 2009/0238038 A1 | 9/2009 | Bagaini et al. | |
| 2009/0321174 A1 | 12/2009 | Endo et al. | |
| 2010/0074054 A1 | 3/2010 | Barakat et al. | |
| 2010/0157727 A1 | 6/2010 | Woodard et al. | |
| 2011/0005801 A1 | 1/2011 | Olivier et al. | |
| 2011/0140692 A1 | 6/2011 | Classen et al. | |
| 2011/0222374 A1 | 9/2011 | Berg et al. | |
| 2011/0286303 A1 | 11/2011 | Paull et al. | |
| 2011/0305114 A1 | 12/2011 | Golparian et al. | |
| 2011/0310704 A1 | 12/2011 | Ray et al. | |
| 2015/0041580 A1 | 2/2015 | Maas et al. | |
| 2015/0043310 A1 | 2/2015 | Maas et al. | |

FOREIGN PATENT DOCUMENTS

| | | |
|---|---|---|
| CN | 1820214 A | 8/2006 |
| CN | 2881667 Y | 3/2007 |
| CN | 101140329 Y | 3/2008 |
| CN | 201237648 Y | 5/2009 |
| CN | 101512383 A | 8/2009 |
| CN | 201392404 Y | 1/2010 |
| CN | 101715547 A | 5/2010 |
| CN | 102012522 A | 4/2011 |
| CN | 102121996 A | 7/2011 |
| EP | 1705489 A2 | 9/2006 |
| EP | 1847850 A2 | 10/2007 |
| GB | 2395640 A | 5/2004 |
| WO | 2010105177 A2 | 9/2010 |
| WO | 2011103032 A2 | 8/2011 |

OTHER PUBLICATIONS

International Search Report and Written Opinion received for PCT Patent Application No. PCT/US2013/029002, dated May 13, 2013, 9 pages.

International Search Report and Written Opinion received for PCT Patent Application No. PCT/US2013/029009, dated May 10, 2013, 9 pages.

Maas et al., "Optical Sensor and Accelerometer Revolution for Seismic Monitoring and Acquisition," AESC, 2006.

Tech Link: A Publication of Petroleum Geo-Services, "Fiber Optic Seismic Technology," vol. 6, Issue No. 8, Jul. 2006.

Cranch et al., "Large-Scale Multiplexing of Interferometric Fiber-Optic Sensors Using TDM and DWDM", Journal of Lightwave Technology, vol. 19, Issue No. 5, May 2001, pp. 687-699.

Cranch et al., "Large-scale Remotely Interrogated Arrays of Fiber-optic Interferometric Sensors for Underwater Acoustic Applications", IEEE Sensors Journal, vol. 3, Issue No. 1, Feb. 2003, pp. 19-30.

Ramotowski et al., "NUWC XP-1 Polyurethane-Urea: A New, "Acoustically Transparent" Encapsulant for Underwater Transducers and Hydrophones", Oceans 2003, vol. 1, 2003.

Zhang et al., "A Novel Fiber Bragg Grating Based Seismic Geophone for Oil/gas Prospecting", Proceedings of the SPIE—The International Society for Optical Engineering , vol. 5765, 2005, pp. 1112-1120.

* cited by examiner

INTEGRATED SEISMIC MONITORING SYSTEM AND METHOD

PRIORITY CLAIM

This application is Continuation application of U.S. Utility patent application Ser. No. 15/597,408, filed 17 May 2017, which is a divisional of U.S. Utility patent application Ser. No. 14/383,207 filed 5 Sep. 2014, which is a National Stage (§ 371) application of PCT/US2013/028997, filed Mar. 5, 2013, and claims the benefit of U.S. Provisional Application No. 61/608,345 filed 8 Mar. 2012, all of which are incorporated herein by reference.

BACKGROUND

The present disclosure relates generally to techniques for investigating subsurface structures. More specifically, the present disclosure relates to optical monitoring systems for measuring seismic parameters of subsurface structures.

The exploration of oil and gas may involve the investigation of subsurface structures, such as geological formations and/or reservoirs. Seismic sensing systems may be positioned about a surface location for sensing properties of the subsurface structures. Such properties may include physical properties, such as pressure, motion, energy, etc. Such properties may occur naturally, or may be generated by imparting a force to the surface using a seismic energy source (e.g., a seismic vibration truck). Examples of seismic vibration trucks used for generating seismic vibrations are provided in US Patent Application No. 2009/0238038. The reflected seismic waves generated by the seismic energy source may be collected and analyzed to determine characteristics of the subsurface structures.

Techniques have been developed for sensing seismic parameters. Examples of such techniques are provided in US Patent/Application Nos. 20080062815, 20080060310, and 20080060311. Some seismic sensing systems may be, for example, optical systems including seismic trucks distributed about a location for independently collecting seismic data. Each seismic truck may have fiber optic cables with optical sensors distributed about a surface of a subsurface structure. The seismic trucks may also have a light source for emitting a laser through the fiber optic cables. The light source distributes light to and collects light from the optical sensors positioned along the fiber optic cables. The seismic truck may have devices for detecting changes in the light. Such changes may be used to determine information about and generate images of the subsurface structures. Examples of optical systems and sensors are provided in U.S. Pat. Nos. 7,622,706, 7,222,534, 7,154,082, and 6,549,488.

Despite the development of advanced techniques for optical seismic monitoring, there remains a need to provide advanced techniques for performing optical seismic monitoring. The present subject matter is directed to fulfilling these needs in the art.

SUMMARY

The present disclosure relates to An integrated seismic system for monitoring seismic parameters of a subsurface structure, the integrated seismic system comprises a base station; a plurality of mobile satellite nodes, each of the plurality of mobile satellite nodes having sensor stations for collecting seismic data from the subsurface structure; and a fiber optic cable extending from the base station to the plurality of mobile satellite nodes and operatively linking the plurality of mobile satellite nodes and the sensor stations; the base station comprises a light source for sending a light through the fiber optic cable, the light being distributed to the sensor stations and, in the sensor stations, experiencing a change or phase shift related to a physical property being measured; and a seismic acquisition unit for receiving seismic signals from the plurality of mobile satellite nodes via the fiber optic cable and generating seismic parameters therefrom.

The seismic cable may link the base station to the mobile satellite nodes in series. The satellite nodes may be seismic trucks. The fiber optic cable may include fiber optic sections coupled together. The seismic acquisition unit may include recording media (e.g., tape drives and/or raid drives), a source controller, an acquisition management system, spread & opto-electronics, and/or a generic acquisition system. The seismic cable may link the satellite nodes to the base station in a looped, a linear, a star, and/or a concentric ring configuration. The sensor stations may be connected to the satellite node by array cables.

The present disclosure also relates to a base station of a seismic system for monitoring seismic parameters of a subsurface structure, the seismic system comprising a plurality of mobile satellite nodes each having sensor stations, the base station being configure to be connected to the plurality of mobile satellite nodes by a fiber optic cable, the base station comprising: a light source configured to send a light through the fiber optic cable, the light being distributed to the sensor stations and, in the sensor stations, experiencing a change or phase shift related to a physical property being measured; and a seismic acquisition unit for receiving seismic signals from the plurality of mobile satellite nodes via the fiber optic cable and generating seismic parameters therefrom.

The present disclosure also relates to a mobile satellite node of a seismic system for monitoring seismic parameters of a subsurface structure, the seismic system comprises a plurality of such mobile satellite nodes and a base station, the mobile satellite node being connected to the base station via a fiber optic cable, the mobile satellite node comprising: sensor stations being operatively linked to the mobile satellite node by the fiber optic cable, and configured to receive a light from a light source at the base station, the light being distributed to the sensor stations and experiencing, in the sensor stations, a change or phase shift related to a physical property being measured.

BRIEF DESCRIPTION OF THE DRAWINGS

A more particular description of the subject matter, briefly summarized herein, may be had by reference to the embodiments thereof that are illustrated in the appended drawings. The figures are not necessarily to scale, and certain features and certain views of the figures may be shown exaggerated in scale or in schematic in the interest of clarity and conciseness.

DETAILED DESCRIPTION

The description that follows includes exemplary apparatuses, methods, techniques, and instruction sequences that embody techniques of the subject matter. However, it is understood that the described embodiments may be practiced without these specific details.

Systems and methods for integrated seismic monitoring are provided. The integrated system includes a base unit, a plurality of mobile satellite nodes, and a plurality of sensor stations. A fiber optic cable joins the base unit to the multiple mobile satellite nodes distributed about a surface location for interactive operation therebetween. Each of the mobile satellite nodes has sensor stations for collecting seismic data relating to a subsurface formation. A single light source at the base unit may be used to send and receive a laser light to each seismic satellite node. The information from each of the seismic satellite nodes may be collected and manipulated at the base station.

Figure 1:
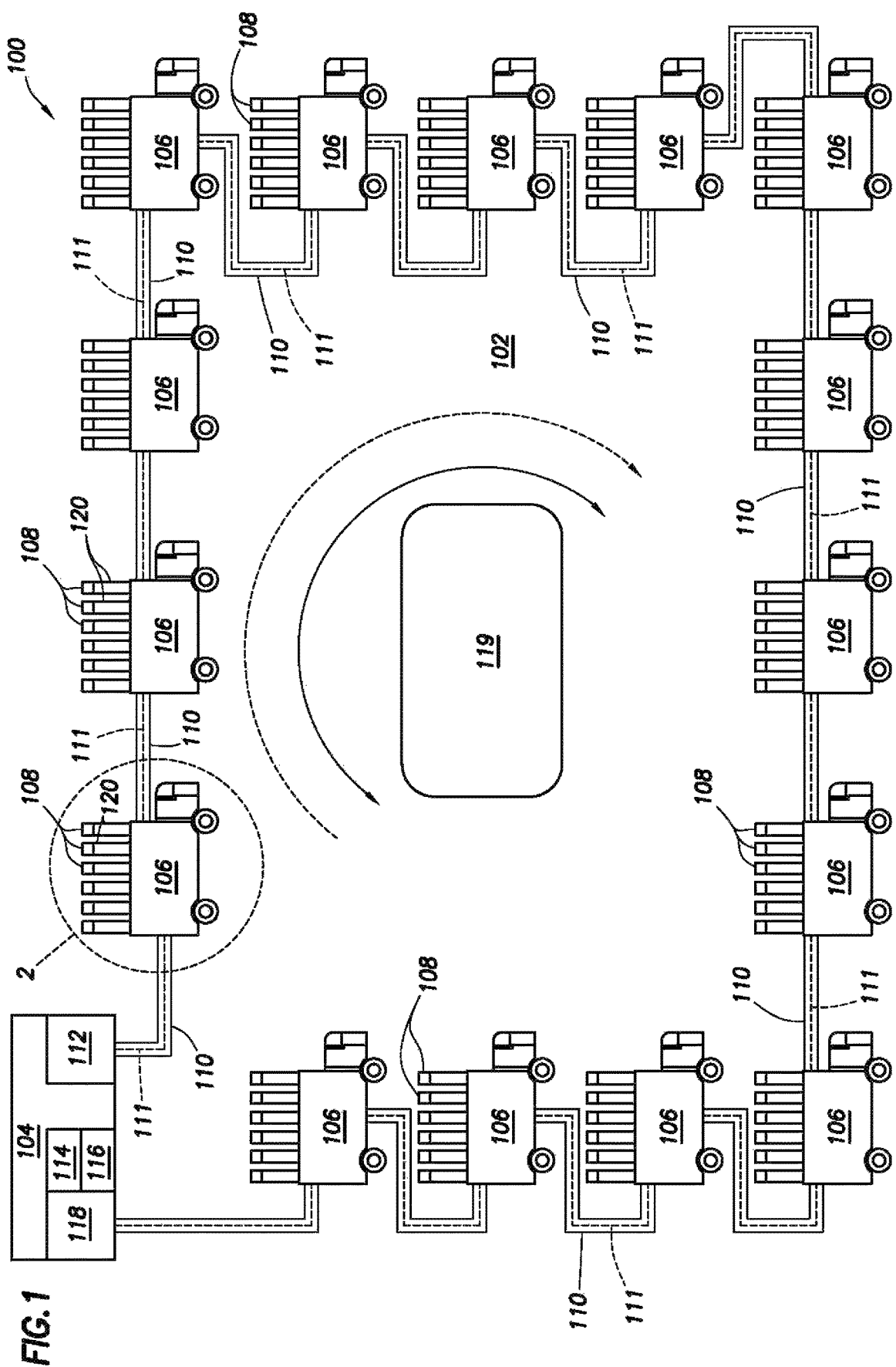
FIG. 1 shows a schematic view of an integrated seismic system for monitoring seismic parameters of a subsurface structure, the system including a base unit, mobile satellite nodes and sensor stations linked by a fiber optic cable.

FIG. 1 schematically depicts a system 100 for monitoring seismic parameters of a subsurface structure 102. The system 100 includes a base station (or camp) 104, multiple mobile satellite nodes 106 and multiple sensor stations 108. The base station 104 may be a consolidated or centralized location for controlling operations throughout the system 100. Operators may be stationed at the base station 104 for performing manual and/or automatic operations throughout the system 100. The mobile satellite nodes 106 may optionally be unmanned with operators located at the base station 104 for controlling operations at each of the satellite nodes 106.

The satellite nodes 106 may be seismic trucks or other mobile devices or vehicles deployable to various surface locations about the subsurface structure 102. Each satellite node 106 may have array (or seismic array) cables 120 linked to multiple sensor stations 108 for collecting seismic data. A seismic cable 110 extends from the base station 104 and to each of the satellite nodes 106. The seismic cable 110 may be deployed from the base station 104 on a reel and extended to each of the sensor stations 108 for communication therewith. A communication network may be formed by linking the base station 104 to the satellite nodes 106 and the sensor stations 108 via the seismic cable 110. The seismic cable 110 may be a unitary cable, or multiple cables joined together to form a single cable. Connectors for joining cables are described in U.S. Pat. No. 6,827,597.

Any cable capable of communicating between the base station 104 and the sensor stations 108 may be used. The seismic cable 110 may be, for example, a conventional fiber optic cable used in seismic surveying. Conventional fiber optic cables, such as a steel armored optical cable with optical fibers inside gel-filled stainless steel tubes, may be used. In some cases, portions of the integrated seismic system may have additional or other communication links using wired or wireless communication links therebetween.

The base station 104 may have a light source 112 including a laser for emitting a laser light 111 through the seismic cable 110. Examples of techniques for passing laser light through a fiber optic cable are described in U.S. Pat. No. 7,622,706. A seismic detector 114 may be provided for detecting changes in the laser light 111. A processor 116 may also be provided for analyzing the changes and determining seismic parameters therefrom. A seismic acquisition unit 118 may be provided at the base station 104 for receiving the light 111 and determining seismic parameters therefrom as will be described further herein. The satellite nodes 106 may be provided with the same capabilities of the base station 104 for operating independently thereof as desired.

A selected length of optical cable 110 may be used to carry light from the light source, which is distributed to the various sensor stations 108 in the seismic system 100. The light in the sensor stations 108 experiences a change or phase shift related to the physical property being measured. Changes in optical characteristics of the optical fibers causes changes in the properties of the applied light which may be detected by one of a number of different optical measurement techniques. Optical signals from the sensor stations 108 are then collected and returned to a receiving device for demultiplexing and analyzing the signals from each sensor station 108.

Examples of fiber optic cables are provided in U.S. Pat. No. 6,850,461. The fiber optic cable may use wavelength-division multiplexing (WDM) and/or frequency division multiplexing (FDM) techniques in which optical splitting of source light from an input bus to individual sensors and recombination of signals from the individual sensors are made in discrete modules, such that optical splicing and splitting or recombining components are mechanically isolated from other portions of the cable. Portions of the cable and/or sensor stations may be replaceable to address any failures that may occur in the system.

A seismic source 119 may be provided for producing impact, vibration, explosion or other seismic events to generate seismic waves through the subsurface structure 102. Conventional seismic sources, such as a seismic vibration truck may be used (see, e.g., US Patent Application No. 2009/0238038). In some cases, the seismic satellite nodes 106 may be capable of generating seismic waves in the subsurface structure 102. The integrated seismic system 100 may be positioned about the seismic source 119 and/or subsurface structure 102 for measuring seismic parameters generated by the seismic source 119.

A data network ring may be set up from the base station 104 to the satellite nodes 106 to communicate the status of the system 100 during the seismic acquisition. The integrated seismic system 100 may form a seismic network about the surface of the subterranean structure. One or more satellite nodes 106 may be linked to the base station 104 to form the network. The satellite nodes 106 may be positioned at various locations about the surface of the subsurface structure 102. The seismic cable 110 may extend from the base station 104 to the satellite nodes 106 in series or in discrete intervals.

As shown in FIG. 1, the satellite nodes 106 form a continuous loop extending from the base station 104 to each of the satellite nodes in series and back to the base station 104. The satellite nodes 106 may be positioned in various configurations, such as the loop (or ring), a star, a linear, and/or other configurations. Various combinations of continuous and/or linear configurations may be used to provide a variety of configurations. The light source 112 at the base station 104 may emit a light 111 for passing through each of the satellite nodes 106 and returning to the base station 104. In a continuous configuration, such as a loop, ring or star, the light 111 may pass through the fiber optic cable 110 and continue to the seismic acquisition unit 118 therein as indicated by the dashed arrow. In a linear configuration, the light source 112 may emit a light 111 therethrough and receive it back therethrough. As indicated by the two way solid arrow, data may pass both ways through system 100 via the seismic cable 110.

The satellite nodes 106 may be processing units with, for example, about a 72,000 channel capacity. Acquisition survey needs may require systems having about one million or more channels. Multiple satellite nodes 106 may be deployed for providing the necessary channel capabilities. The integrated network formed by the system 100 may be used to operate the channels provided by multiple satellite nodes 106 from a single location. The seismic acquisition unit 118 may be used to receive and process the data from the multiple nodes and to perform necessary quality control (QC) and operational control. The integrated configuration provided by the system 100 may be used to compare data from multiple sources, eliminate redundancies, and provide an integrated analysis of the data.

Figure 2:
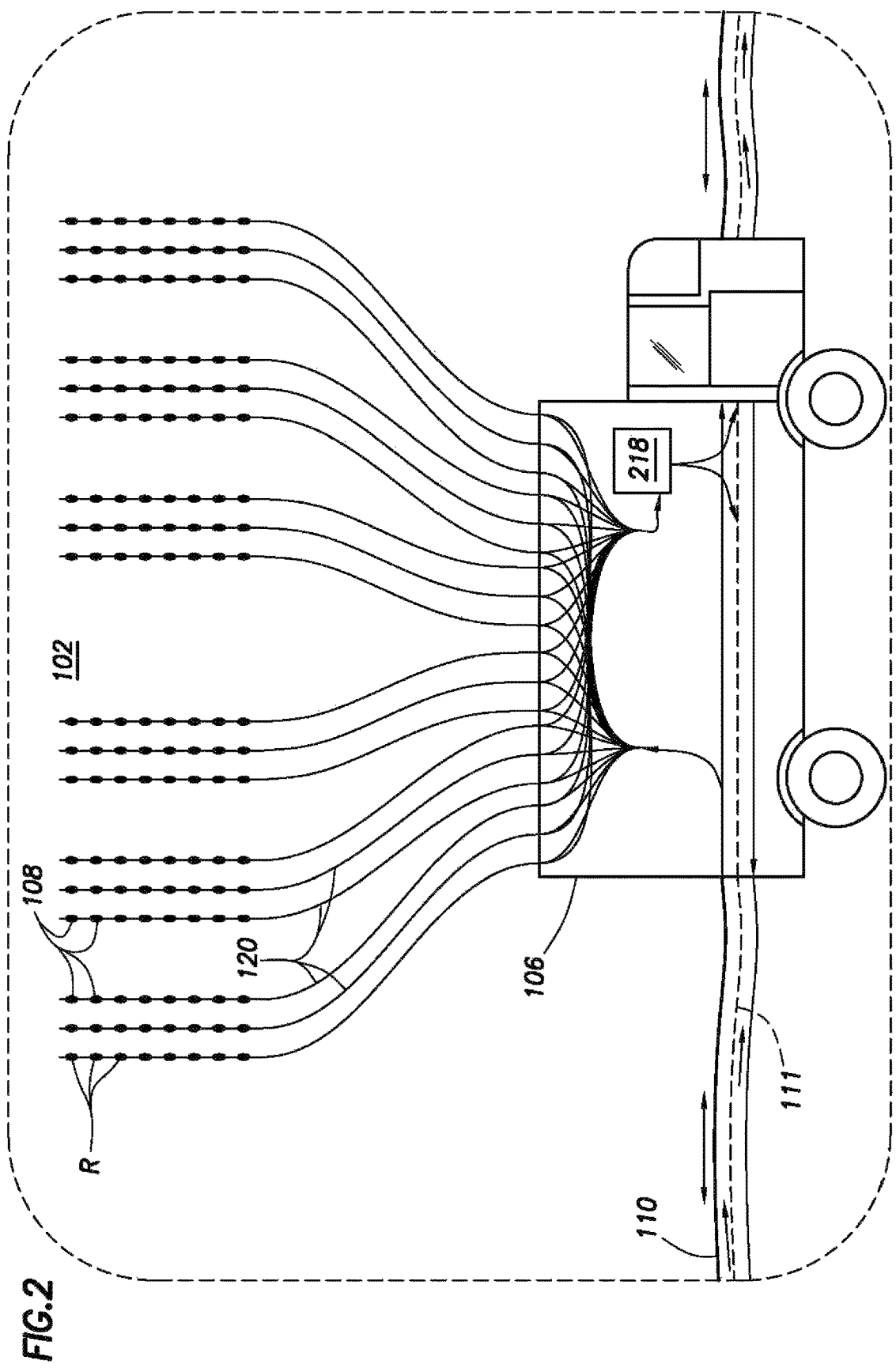
FIG. 2 shows a schematic view of a portion 2 of the system of FIG. 1 depicting the mobile satellite node and sensor stations in greater detail.

FIG. 2 shows a schematic view of a portion 2 of the seismic system 100 of FIG. 1. This figure also shows one of the satellite nodes 106 (depicted as a seismic truck) and the sensor stations 108 in greater detail. As shown, multiple array cables 120 extend from the satellite node 106, with each array cable 120 having multiple sensor stations 108. The sensor stations 108 may be operatively connectable to the satellite node 106 for interaction therewith. The sensor stations 108 may be carried by the seismic cable 110, or connected thereto at the surface locations. The sensor stations 108 may be conventional optical sensors positionable about the surface locations for measuring seismic parameters of the subsurface structure 102. The optical sensors may be, for example, hydrophones, accelerometers, or geophones, for sensing physical properties, such as subsurface motion, energy or changes in pressure. The sensor stations 108 may have radio frequency identification (RFID) tags R containing information, such as identifiers, for each sensor station.

The sensor stations 108 may be connected to a sensor pad on the seismic cable 110. By way of example, the sensor pads may be located about every 25 m along the seismic cable 110. The sensor stations 108 may be positioned at various locations and used to generate an optical signal in response to the sensed physical properties. The optical signal may be, for example, a change in wavelength, a change in phase or an interference pattern in response to changes in the physical parameter. Examples of optical sensor stations are provided in U.S. Pat. Nos. 7,154,082, and 6,549,488. Multiple sensor stations 108 may be multiplexed from the light source 112 at the base station 104 and signal return optical fibers using optical telemetry systems.

As shown in FIG. 2, the seismic cable 110 enters the satellite node 106 from the base station 104 and is split out into the array cables 120. The seismic cable 110 continues through the satellite node and on to the next satellite node(s) and back to the base station 104. Communication with the base station 104 may be provided with the satellite node 106 and/or sensor stations 108 for determining seismic parameters. The laser light 111 may pass through the seismic cable 110, through the satellite node 106 and out on to the base station 104 as indicated by the dashed arrows. The laser light 111 is also directed through the sensor cables and returned back to the satellite node 106. When the laser light 111 passes from the base station 104 to the satellite nodes 106, the satellite nodes 106 collect, amplify and redistribute the light.

The seismic cable 110 may also be used to pass data between the satellite node 106 and back to the base station 104 as indicated by bidirectional arrows. The data may be directed to the seismic acquisition unit 118 of FIG. 1. The satellite node 106 may house its own seismic acquisition unit 218 for collecting and recording seismic data for its sensor stations 108. The seismic acquisition units 118 and/or 218 may receive the light 111 that passes to the sensor stations 108 and is returned therefrom, and may determine seismic parameters as will be described further herein. The seismic acquisition unit 218 may have part or all of the functionality of the seismic acquisition unit 118 of FIG. 1.

Figure 3:
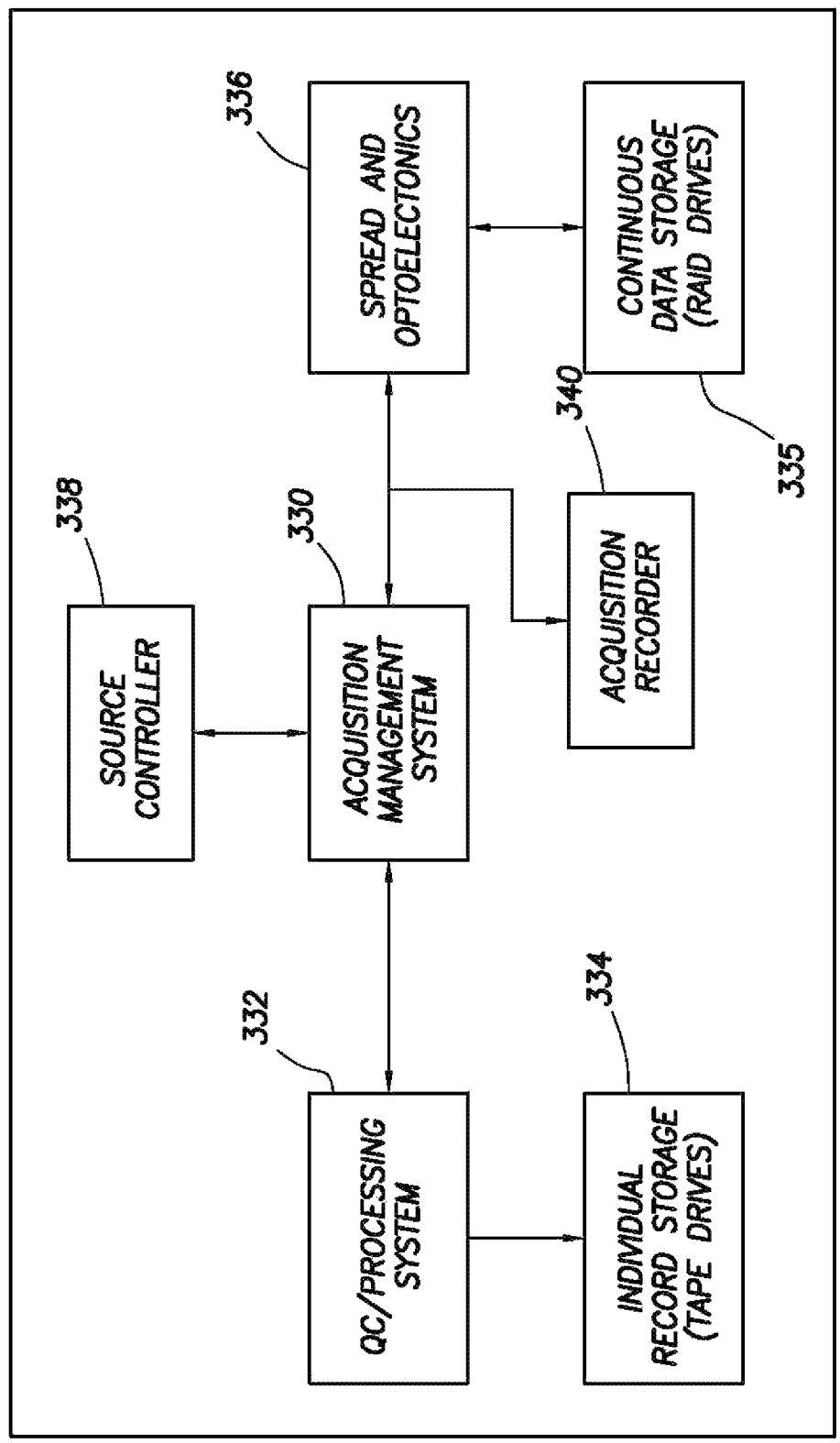
FIG. 3 shows a schematic view of a seismic acquisition unit.

FIG. 3 is a schematic view of system architecture that may be used as the seismic acquisition unit 118 of the base station 104 of FIG. 1 and/or the seismic acquisition unit 218 of the satellite node 106 of FIG. 2. The seismic acquisition unit 118/218 includes electronic components including an acquisition management system 330, a QC/Processing System 332, recording media 334, 335, spread & optoelectronics 336, a source controller 338, and an acquisition recorder (or generic acquisition system (sometimes referred to as "gAS?")) 340. Various links may be provided between the electronic components for operative connection therebetween.

The source controller 338 provides communication between an operator at the base station and the satellite nodes 106. Data from the satellite nodes 106 is passed from the source controller 338 to the acquisition management system 330. The acquisition management system 330 provides communication between an operator at the base station 104 and the satellite nodes 106. Data from the satellite nodes 106 is passed back to the acquisition management system 330. The acquisition management system may also communicate with the source controller 338 to provide vibrator information to be stored along with the data. The acquisition management system 330 acts as a central processing unit (CPU) for processing all of the data of the seismic acquisition unit 118/218. The acquisition management system 330 also communicates with the QC/Processing system 332 and the spread & optoelectronics 336. The QC/Processing system 332 may be a network computer used for data manipulation, such as signal processing, visualization of data, etc. Data from the QC/Processing system 332 may be passed to an individual record storage 334 for recording. The individual record storage 334 may be a recording media, such as tape drives for storing the data.

The spread & optoelectronics 336 receives signals from the satellite nodes 106 and converts the signals into seismic data for recording. The seismic data may be passed from the spread & optoelectronics 336 to the acquisition recorder 340 for formatting by an Ethernet connection. The acquisition recorder 340 formats the seismic data for recording. The formatted data may be passed to a recording media 335, such as a continuous data storage, for recording. The data storage 335 may be a recording media, such as a raid drive for storing the data.

The system architecture enables the seismic acquisition and QC functions to take place in the centralized base station 104. The satellite nodes 106 may also perform certain functions, such as initial quality control (QC) functions, at the seismic acquisition unit 218 and report status back the seismic acquisition unit 118 of the base station 104 where the main control takes place. Information may be provided at multiple levels to provide redundancy, cross-checks, and interpretation.

The seismic acquisition unit 118/218 may also be used to collect information from the RFID tags R of the sensor stations 108. The computers in the system and/or additional RFID units may be provided to communicate with and/or collect information from the RFID tags. The RFID tags R may be scanned by an RFID unit (not shown) during or after deployment to the field 102 to identify the RFID unit by location along the surface location 102. The RFID unit may also have an RFID sensor for receiving data from and logging the sensor stations. This information may be used with the data collected by the seismic cable 110 and/or sensor stations 108 to, for example, correlate seismic data with location and/or sensor information specific to the identified sensor station 108.

The seismic acquisition unit 118/218 may have processors/computers to provide such correlations. For example, the seismic acquisition unit 118/218 may have a global positioning satellite (GPS) tracker that gathers information from the RFID tags that may be used to plot a position of the sensors using. Information concerning a location of each sensor may be determined using conventional GPS technology linked to an output from each sensor station 108. The GPS data may provide position data in a three dimensional axis. Z-axis data may provide elevation information so that the sensor stations may be corrected to a similar flat datum. X-axis and Y-axis data may position data so that digital filters can be provided to remove additional error. The gathered GPS data for each sensor station may be correlated with the data collected by the sensor station for further analysis. The analyzed information may be used to determine subsurface properties at a given location.

In operation, dense wavelength division multiplexing (DWDM) may be used in the integrated seismic system 100 to optically power the sensor stations 108. By way of example, an optoelectronic cabinet may be assembled using 10 wavelengths with the capacity to run 960 sensor or 240 4C channels. Multiplexed and modulated light 111 may be sent into the seismic cable 110 and the array cables 120 to the sensor stations 108. The light 111 returning from the sensor stations 108 may be demultiplexed and demodulated. A phase modulated laser light 111 passes through an interferometer in the sensor station 108. Stress from the outside world causes a phase shift in the light 111 as it passes through the interferometer. Using the seismic acquisition system 118/218, the phase information is extracted from the returning light to output a signal equivalent to the stress input at the sensor station 108. This provides a passive system with no electronics.

The light source 112 generates the optical power for the array of sensor stations 108, and processes the returned optical signals to extract the seismic information. Light 111 returning from the sensor array cables 120 may be routed to a select group of demodulation boards to process the optical data, and outputs a 'word' (e.g., a 32-bit digital word) equal to the seismic data. The data may be processed by the seismic acquisition unit 118 (e.g., a network interface card), where it is put into data packets, and sent to the data storage 334, 335.

Figure 4:
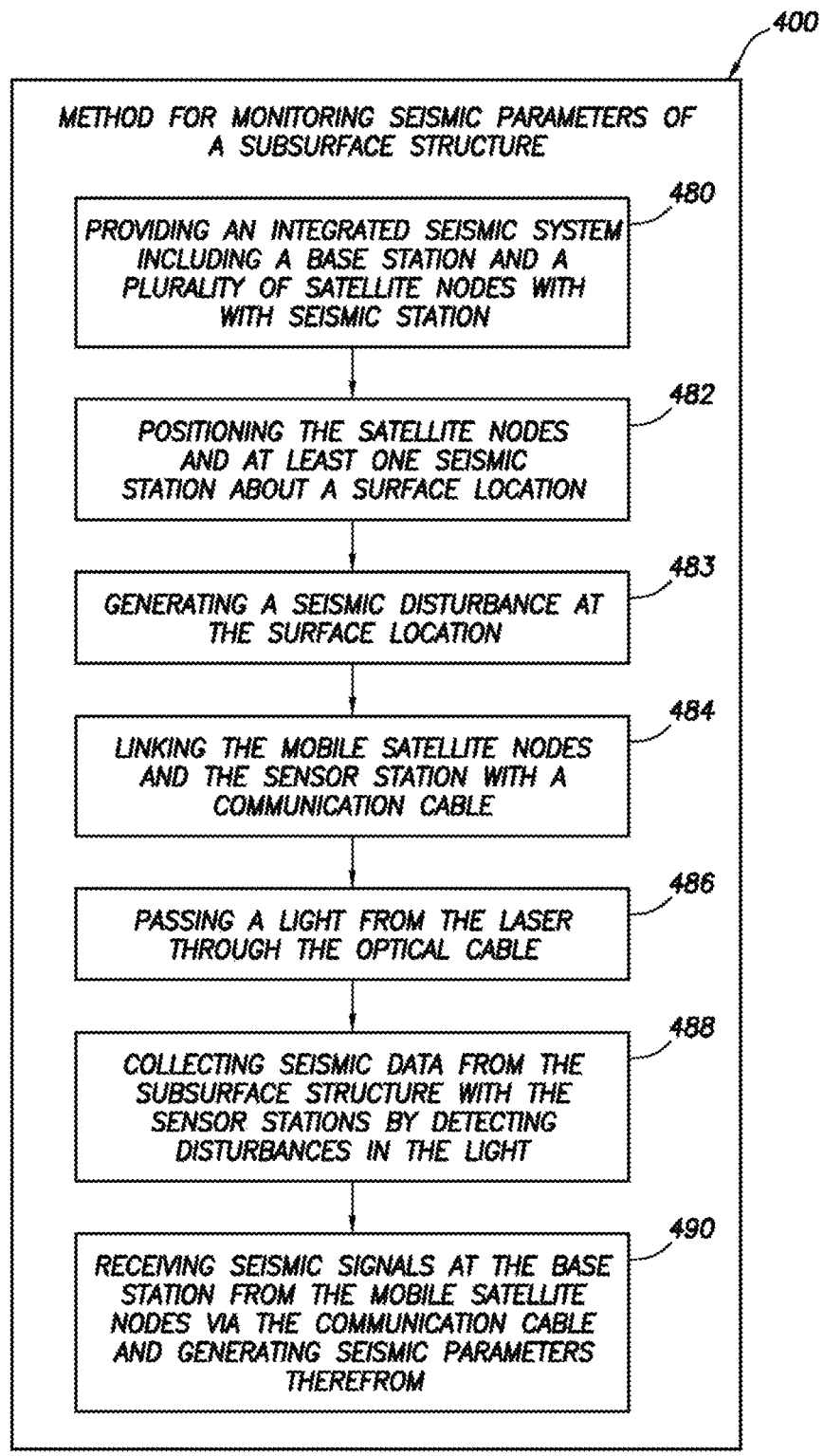
FIG. 4 is a flow chart depicting a method of monitoring seismic parameters of a subsurface structure.

FIG. 4 is a flowchart depicting a method 400 of monitoring seismic parameters of a subsurface structure 102. The method 400 involves providing an integrated seismic system such as the system 100 of FIG. 1 (e.g., including a base station 104 and a plurality of satellite nodes 106 and a plurality of sensor stations 108). The method also involves positioning (482) the satellite nodes and the sensor station about a surface location, generating (483) a seismic disturbance at the surface location, linking (484) the mobile satellite nodes and the sensor station with a seismic cable, passing (486) a light from the laser through the optical cable, collecting (488) seismic data from the subsurface structure with the sensor station by detecting disturbances in the light, and receiving (490) seismic signals at the base station from the mobile satellite nodes via the seismic cable and generating seismic parameters therefrom.

The method may also involve analyzing the measured seismic parameters. Other steps may also be performed, such as performing a quality control check, and/or capturing and/or correlating information from the sensed RFID tags with the subsurface data collected by the sensor stations. The steps may be performed automatically or manually, in any order and repeated as desired.

While the present disclosure describes configurations, numerous modifications and variations will become apparent to those skilled in the art after studying the disclosure, including use of equivalent functional and/or structural substitutes for elements described herein. For example, aspects of the subject matter may include two or more seismic trucks (or nodes) connected by one or more seismic cables, and have one or more sensor stations.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components.

What is claimed is:

1. An integrated seismic system for monitoring seismic parameters of a subsurface structure, the integrated seismic system comprising:
   a base station;
   a plurality of mobile satellite nodes, each of the plurality of mobile satellite nodes having multiple array cables extending from the mobile satellite nodes and each of the multiple array cables being linked to multiple sensor stations for collecting seismic data from the subsurface structure; and
   a fiber optic cable extending from the base station to the plurality of mobile satellite nodes and operatively linking the plurality of mobile satellite nodes and the sensor stations;
   the base station comprising:
   a light source for sending laser light through the fiber optic cable, the laser light being distributed to the sensor stations and, in the sensor stations, experiencing a change or phase shift related to a physical property being measured; and
   a detector for receiving the laser light from the fiber optic cable and detecting changes in the laser light; and
   each of the satellite nodes comprising:
   a seismic acquisition unit for receiving optical signals in the laser light returning from the multiple sensor stations in the array cables that extend from the satellite node in which the seismic acquisition unit is housed, said seismic acquisition unit comprising spread and optoelectronics that extracts phase information induced by said change or phase shift from the returning laser light and converts the optical signals into seismic data, wherein said seismic acquisition unit is connected to the base station through said fiber optic cable to pass the seismic data to the base station.

2. The integrated seismic system of claim 1, wherein the fiber optic cable comprises a plurality of fiber optic sections coupled together into a continuous fiber optic cable.

3. The integrated seismic system of claim 1, wherein the fiber optic cable links the base station to the plurality of mobile satellite nodes in series.

4. The integrated seismic system of claim 1, wherein the fiber optic cable links the plurality of mobile satellite nodes to the base station in one of a looped configuration, a linear configuration, a star configuration, a concentric ring configuration and combinations thereof.

* * * * *